J. B. Raynor,
Rotary Churn.

No. 3,012. Reissued June 30, 1868.

Witnesses:

A. H. Mart

Cornelius Co.

Inventor:

John B. Raynor per

Alexander Mason

Atty

N. PETERS, PHOTO-LITHOGRAPHER, WASHINGTON, D. C.

United States Patent Office.

JOHN B. RAYNOR, OF MAZO MANIE, WISCONSIN.

*Letters Patent No.* 74,941, *dated February* 25, 1868; *reissue No.* 3,012, *dated June* 30, 1868.

IMPROVEMENT IN CHURNS.

The Schedule referred to in these Letters Patent and making part of the same.

TO ALL WHOM IT MAY CONCERN:

Be it known that I, JOHN B. RAYNOR, of Mazo Manie, in the county of Dane, and in the State of Wisconsin, have invented certain new and useful Improvements in Churns; and do hereby declare that the following is a full, clear, and exact description thereof, reference being had to the accompanying drawings, and to the letters of reference marked thereon.

Figure 2:
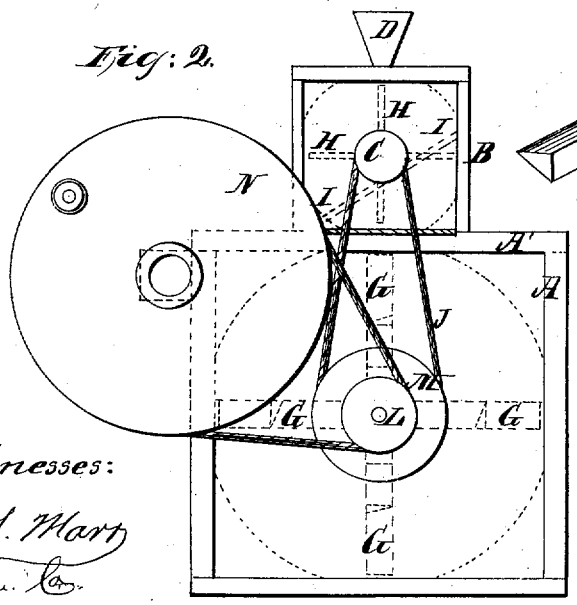

In the annexed drawings, making part of this specification, A represents a square churn-box, of any suitable dimensions, and provided with a cover, A′. The bottom of the churn-box, as well as the under side of this cover, are both made concave, as represented in red lines, Figure 2.

E represents a horizontal shaft, which is placed centrally within the box A, and which has its bearings in the sides of said box. This shaft is provided at one end with two pulleys, M and L, and within the box with a series of arms, G G.

Figure 1:
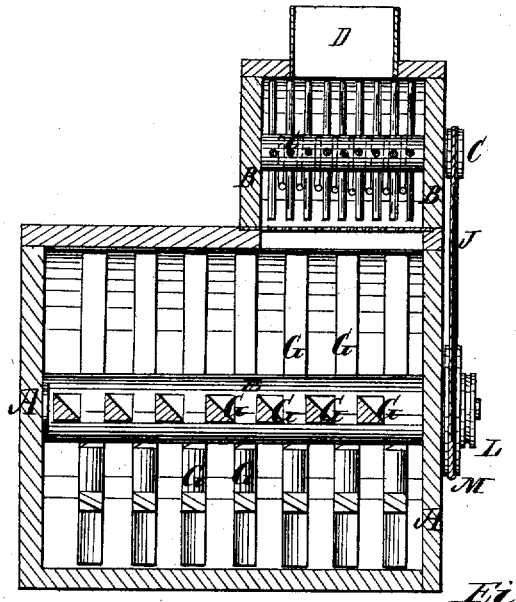
Figure 3:
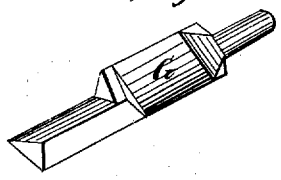

These arms are made in the peculiar shape represented in Figure 3, with their angles so placed as to cut the milk or cream as they revolve with the shaft E.

Placed upon the cover A′ is a small box, B, which is provided with a suitable cover, and this cover with a funnel, D. A slot is cut through cover *11*, beneath the box B, so as to open communication between the two, and this slot is covered with a perforated plate, or with gauze wire. Running across box B, in an inclined position, but parallel to each other, is a series of rods, I I.

C represents a shaft, which is placed in a horizontal position in box B, and provided with a series of straight arms, H H. The ends of these arms cut between the rods I I, when the shaft C is revolved. The shaft C has its bearings in the sides of the box, and is provided upon its outer end with a pulley, C′. A band, J, connects pulley C′ to the pulley M, on shaft E.

N represents a large pulley, which is secured upon an axle, which is secured to one side of the box. This pulley is provided with a handle, by means of which it is revolved. A band, K, connects pulley N to pulley L on shaft E. When the operator turns the pulley-wheel N, the band K communicates motion to shaft E, and this shaft, through its pulley M and the band J, gives motion to shaft C.

The shaft E may be placed vertically in the box A, when the requisite change in the gearing will be made.

In using this churn, the milk or cream is poured into the funnel D, and while being poured in, the shafts, with their arms, are set in motion. The milk is cut up by the arms and rods in box B, and then passes through the slot in the bottom of said box, to the box A, where it is subjected to the beating of the arms G G. The milk is rapidly broken by the combined action of the two shafts with their arms. and is made to yield its butter in a few moments.

Having thus fully described my invention, what I claim as new, and desire to secure by Letters Patent, is—

1. The shaft C, provided with a series of straight arms H H, when arranged in combination with the box B, having a series of rods, I I, in the manner and for the purposes set forth.

2. The angular arms G, constructed as shown and described, and arranged upon the dasher-shaft, to operate substantially as and for the purposes specified.

In testimony that I claim the foregoing, I have hereunto set my hand, this 22d day of April, 1868.

JOHN B. RAYNOR.

Witnesses:

J. C. COWDERY,

S. ALDRED.